W. H. RAPEPORT.
BUMPER OR FENDER FOR AUTOS, ETC.
APPLICATION FILED JUNE 22, 1922.
1,436,682. Patented Nov. 28, 1922.
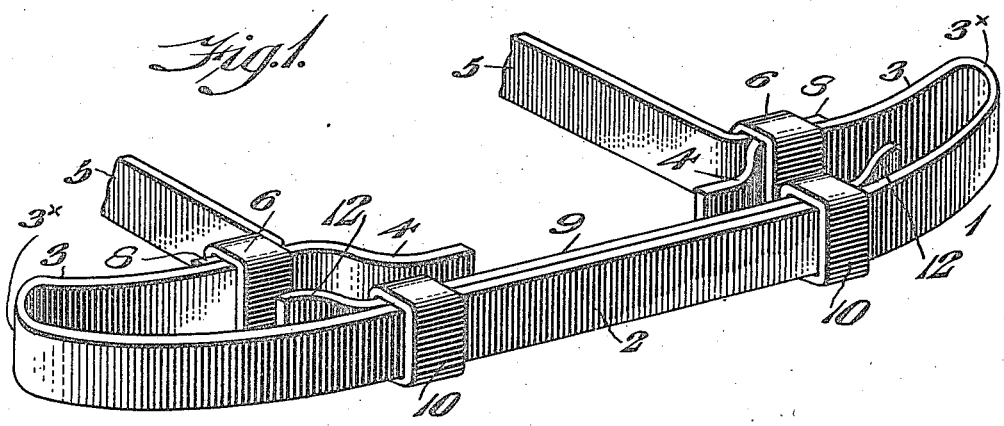
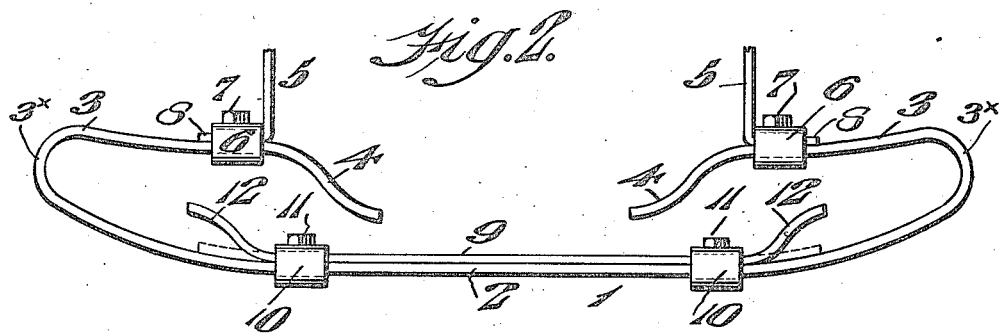
INVENTOR:
William H. Rapeport
BY
Wiedersheim + Fairbanks
ATTORNEYS.

Patented Nov. 28, 1922.

1,436,682

UNITED STATES PATENT OFFICE.

WILLIAM H. RAPEPORT, OF PHILADELPHIA, PENNSYLVANIA.

BUMPER OR FENDER FOR AUTOS, ETC.

Application filed June 22, 1922. Serial No. 570,187.

*To all whom it may concern:*

Be it known that I, WILLIAM H. RAPEPORT, a citizen of the United States, residing in the city and county of Philadelphia, State of Pennsylvania, have invented a new and useful Bumper or Fender for Autos, Etc., of which the following is a specification.

My invention consists of a fender of an auto or other vehicle, consisting of a resilient fender proper, and resilient tongues which project respectively rearwardly and forwardly from the front and rear members of the fender proper to add increased resiliency to the fender proper when the latter is subjected to the impact of any object in its path.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a perspective view of a fender embodying my invention.

Figure 2 represents a top or plan view thereof.

Similar numerals of reference indicate corresponding parts in the figures.

Referring to the drawings:—

1 designates the fender proper consisting of the resilient front bar 2 and the rear inturned portions 3, the latter being joined to the front bar by the resilient side bends 3ˣ of the fender usual in such cases. The inner terminals of said portions or members project towards the front bar 2 forming the flaring resilient tongues 4. The portions 3 are clamped and firmly secured to the attaching arms 5 by means of the clips 6 and the screws 7, said clips embracing the relative portions 3 and the elbows 8 of the arms 5 and the screws 7 being adapted to be tightened against said elbows.

On the inner side of the front bar 2 is the reinforcing bar 9 which extends along the main portion of the said front bar and is clamped and firmly secured thereto by the clips 10 and screws 11, said clips embracing the relative portions of said bars 2 and 9 and the screws being adapted to tighten against said bar 9, said bar 9 thus being coupled to the front portion of the fender proper.

The bar 9 has on its terminals lateral extensions which are projected towards the rear inturned portions 3 and form the flaring resilient tongues 12, their projections being in directions opposite to that of the resilient tongues 4.

It will now be seen when the fender proper is struck or strikes an object in its path, the fender proper receives the blow and shock and yields and so the front bar 2 moves rearwardly whereby the tongues 12 on the rear portions of the fender are impacted against the rear inturned portions 3 while the front of the fender is impacted against the front of the fender, and so as both sets of tongues 12 and 4 yield resiliently each takes up some of the blow and shock primarily imparted to the fender proper and so a highly resilient fender is provided for the purpose intended, the resiliency being provided by the front and rear portions of the fender proper and the bends joining the same, and the plurality of resilient tongues projecting in opposite directions from the front and rear portions of the fender proper.

The bar 9 strengthens the main portion of the front of the fender while being also resilient in its nature like said portion and provides also the means for carrying the resilient tongues 12.

Having thus described my invention what I claim as new and desire to secure by Letters Patent, is:—

1. A fender proper consisting of front and rear portions, resilient tongues on the front member thereof, and resilient tongues on the rear members thereof, said tongues projecting in opposite directions respectively rearwardly and forwardly from their places of attachment.

2. A fender proper consisting of front and rear portions, resilient tongues projected rearwardly from the front member of the fender proper, and resilient tongues projecting forwardly from the rear members thereof, said tongues projecting respectively in opposite directions from their place of attachment.

3. A fender consisting of a front member, rear members inturned from the side bends thereof, a longitudinally extending bar connected with said front member, resilient tongues carried on the terminals of said bar, and resilient tongues carried on the terminals of said rear members, said tongues projecting respectively in opposite directions from the respective carriers.

WILLIAM H. RAPEPORT.

Witnesses:
JOHN A. WIEDERSHEIM,
C. S. McVAY.